US006012830A

United States Patent [19]

Fraizer

[11] Patent Number: 6,012,830

[45] Date of Patent: Jan. 11, 2000

[54] LIGHT SHIELD FOR A VEHICLE HEADLAMP

[75] Inventor: Robert L. Fraizer, Seymour, Ind.

[73] Assignee: Valeo Sylvania L.L.C., Seymour, Ind.

[21] Appl. No.: 09/102,793

[22] Filed: Jun. 23, 1998

[51] Int. Cl.$^{7}$ .......... B60Q 1/04

[52] U.S. Cl. .......... 362/539; 362/507; 362/505; 362/487; 362/459

[58] Field of Search .......... 362/487, 496, 362/505–507, 509, 538, 539, 351, 353, 359, 361; 359/227, 229; 313/635, 117; 501/87

[56] References Cited

U.S. PATENT DOCUMENTS 4,197,175 4/1980 Moll .
4,990,229 2/1991 Campbell .
4,992,153 2/1991 Bergmann .
5,122,252 6/1992 Latz .
5,126,033 6/1992 Szczyrbowski .
5,196,105 3/1993 Feuerstein .
5,234,560 8/1993 Kadlec .
5,346,600 9/1994 Nieh .
5,487,922 1/1996 Nieh .
5,537,257 7/1996 Rudigier .
5,569,362 10/1996 Lerbet .
5,601,654 2/1997 Springer .

*Primary Examiner*—Sandra O'Shea
*Assistant Examiner*—Ismael Negron
*Attorney, Agent, or Firm*—William E. Meyer

[57] ABSTRACT

The vehicle headlamp uses a light shield with a interior surface with a rough, black ceramic coating. The ceramic surface absorbs almost all the visible light shone on it. The surface is highly resistant to the heat generated by the light absorption, and the roughness breaks up visible light images in any small amount of reflected light. The ceramic material does not outgas or deteriorate so as to leave a film on the other lamp elements.

20 Claims, 2 Drawing Sheets

LIGHT SHIELD FOR A VEHICLE HEADLAMP

1. TECHNICAL FIELD

The invention relates to electric lamps and in particularly to vehicle lamps. More particularly the invention is concerned with a light shield as maybe used in a headlamp.

2. BACKGROUND ART

Vehicle headlamps are commonly made with small, intense light sources. These light sources may be either tungsten halogen filament sources or high intensity discharge sources. Most of the generated light is controlled and directed by the reflector to be projected as a properly formed light beam. However, a portion of the light from the source goes directly forward and cannot be controlled by the reflector. Another portion of the light is reflected from nearby supports and wall structures that are closer to the source than is the reflector. These nearby objects then act as if they were secondary light sources acting as what is called parasitic sources. The directly projected light, and the reflections from parasitic sources are usually uncontrolled, and result in glare. It is frequently preferred to block this light with a light shield to limit the resulting glare.

The light and heat reflected from the center of the reflector normally adds to the heat and light coming directly from the light source, to heat in a center spot of the exterior lamp lens. The center of the lens can then suffer heat stress. Again, it is frequently preferred to shield this light to protect the exterior lens.

The light block or light shield may be a wall or similar structure placed intermediate the light source and the exterior. Light shields commonly have a cup shape. The light received in the light shield should not be reflected back out in an uncontrolled manner, so it is common to coat the inside surface of the light shield with a light absorbing material. The light shield frequently absorbs the received light and converts it to heat. As a result, the light shield becomes hot.

It has been found that over the life of a headlamp, the light absorbing material coating the light shield can either quickly or over time outgas material as the light shield bakes during lamp operation. The outgased material migrates in the enclosed headlamp, and condenses on the other structures, the reflector, the inside surface of the exterior lens, and even the light source itself. The resulting film may color the light or reduce the total amount of projected light. The headlamp then looks dingy, and performs less well. There is then a need for an inexpensive light shield coating that does not outgas during the life of operation.

DISCLOSURE OF THE INVENTION

A vehicle headlamp having a light shield may be formed from a vehicle housing defining an enclosed volume, and an opening; the housing enclosing a reflector, and a light source; a light shield being positioned intermediate the light source and the defined opening; the light shield having a surface facing the light source including a layer of a high temperature ceramic; and a lens positioned to cover the defined opening.

BEST MODE FOR CARRYING OUT THE INVENTION

Figure 1:
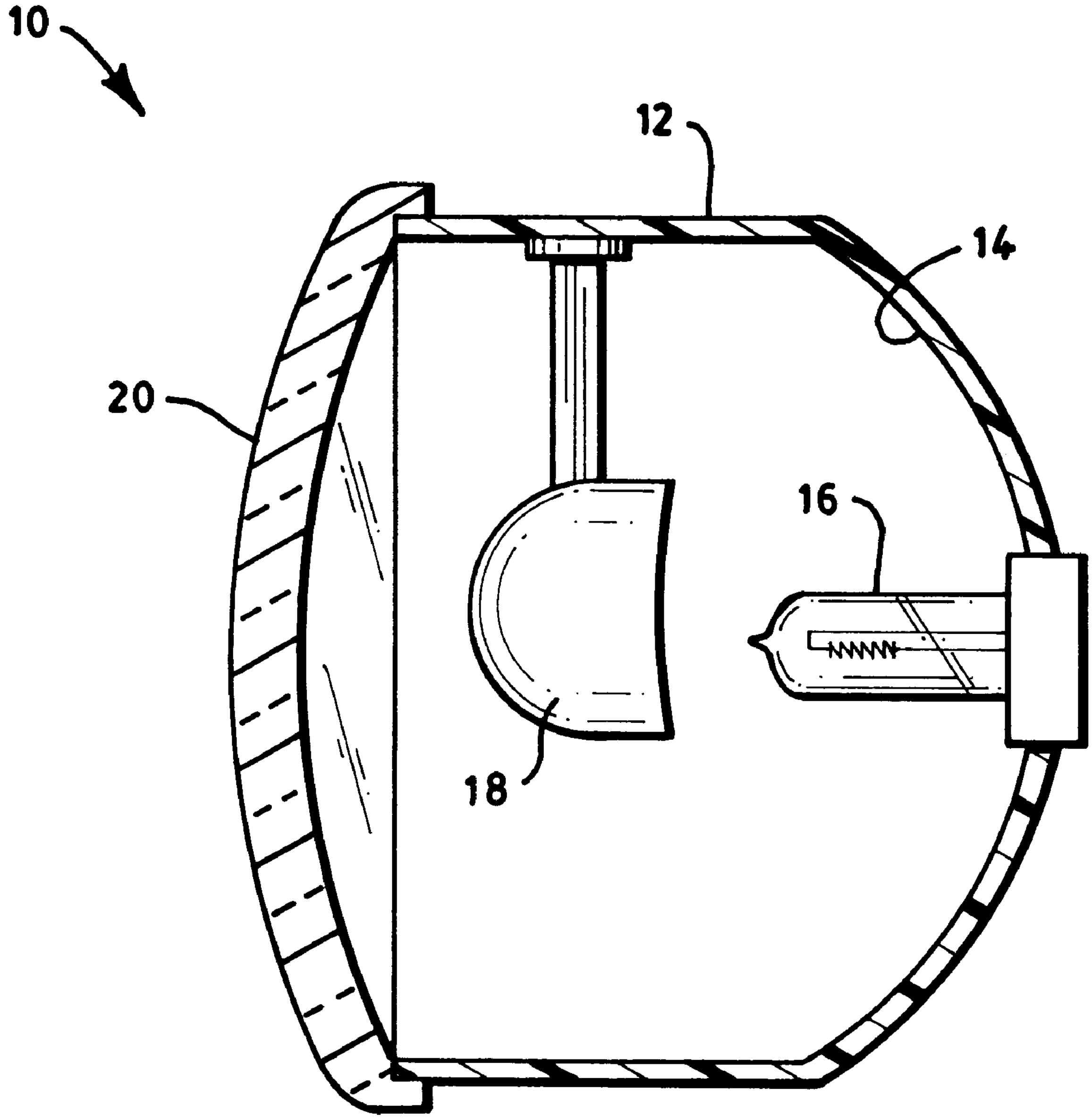
FIG. 1 shows a cross sectional view of a preferred embodiment of a vehicle headlamp having a light shield.

FIG. 1 shows a preferred embodiment of a vehicle headlamp having a light shield. Like reference numbers designate like or corresponding parts throughout the drawings and specification. The vehicle headlamp 10 having a light shield is assembled from a vehicle headlamp housing 12, a reflector 14, a light source 16, light shield 18, and a lens 20.

The vehicle headlamp housing 12 may be made out of bulk filled plastic resin to have the general form of a walled body defining an enclosed volume with an opening to the volume. A vehicle headlamp housing 12 usually includes a defied opening that is sufficient to allow the projection therethrough of a light beam with a pattern to illuminate the roadway sufficiently for the vehicle. The defined opening is usually a majority of the forward facing portion of the housing 12. The vehicle headlamp housing 12 may additionally include mounting and aiming hardware, electrical couplings, sealing and lens features as is generally known in the art. These additional features are a matter of design choice, and are not considered relevant here. The reflector 14 may be made out of smooth, high temperature resin to have the general form of a concave shell defining an interior volume with at least a portion of the interior surface being reflective. The vehicle headlamp housing 12 may alternatively be formed as a reflective internal housing wall. The light source 16 may be made out of tubular glass to have the general form of a tube section closed at each axial end. The vehicle headlamp housing 12 encloses the light source 16, and the reflector 14 is positioned to face the light source 16, so as to project a light beam through the defined opening in a forward direction.

Figure 2:
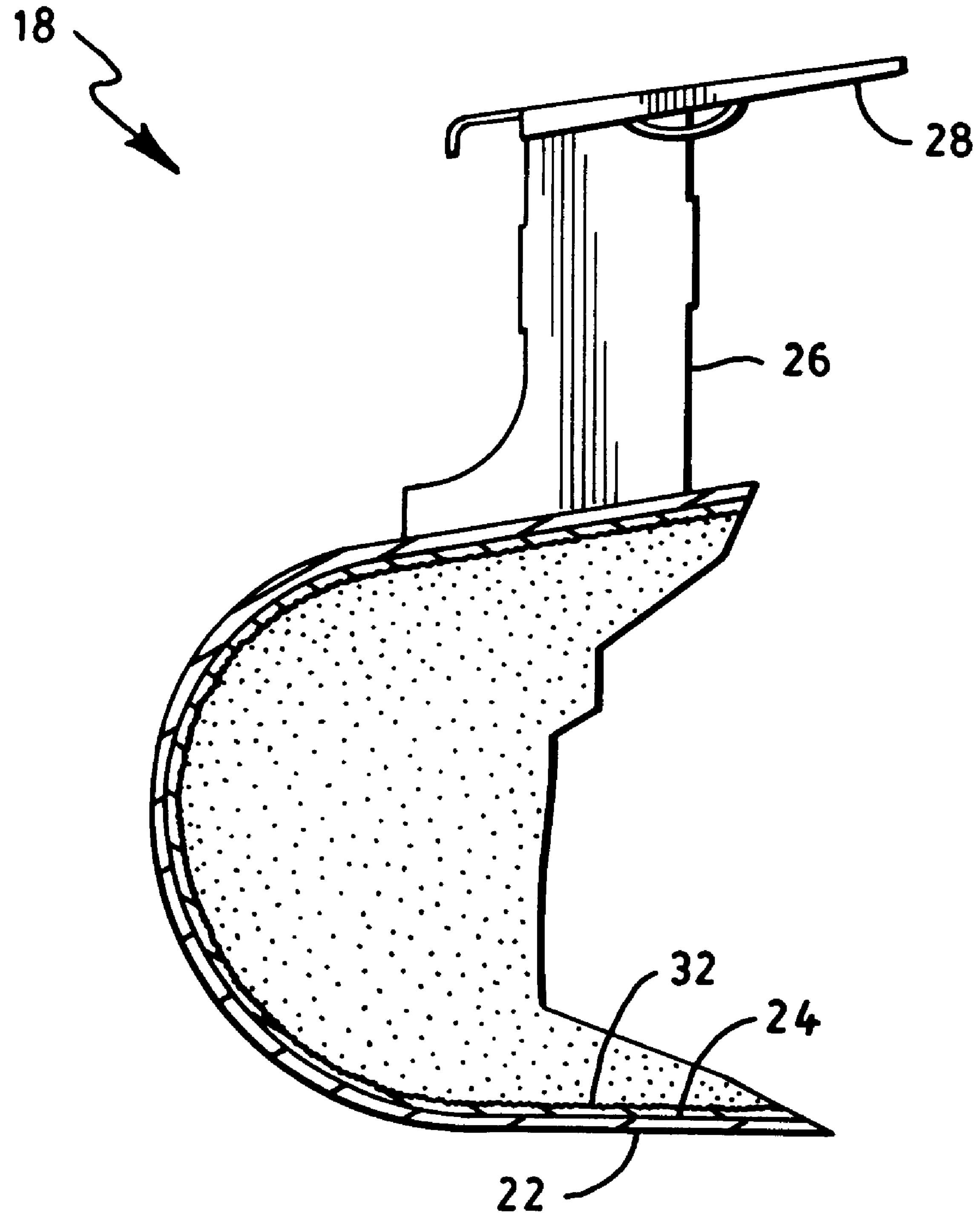
FIG. 2 shows a cross sectional view of a light shield.

FIG. 2 shows a cross sectional view of a light shield 18. The light shield 18 may be made out of chrome plated steel to have the general form of a cup. The vehicle headlamp housing 12 encloses the light shield 18. The light shield 18 is positioned to be intermediate the light source 16 and the defined opening. The preferred light shield 18 has the form of a cup with a wall defining an exterior surface 22, and an interior surface 24. In the preferred embodiment the interior surface is roughened to assist in breaking up any possible light source image. In the preferred embodiment the exterior surface 22 faces the defined opening. The preferred light shield 18 may be supported by an attachment leg 26, that is coupled to either the vehicle headlamp housing 12, or the reflector 14. In one embodiment the leg 26 was formed with a foot 28 that slid into a slot formed on the inner surface of the vehicle headlamp housing 12. The foot 28 may then be held in place by a screw, clip, friction, press fit, formed latch or other mechanical means.

On the interior surface 24 of the light shield 18 is formed a ceramic inner layer 32. In the preferred embodiment, the ceramic inner layer 32 is not smooth. Rather, it is rough, pitted, or otherwise formed with crevices and peaks so as to form an irregular reflecting surface. Additionally the preferred ceramic inner layer 32 is highly absorbent with respect to visible light. The absorbent surface substantially reduces reflections from the inner layer 32. This prevents most of the impinging light from being reflected back to the light source 16 or the reflector 14. By forming the inner layer 32 in an irregular fashion, any image in the small amount of light that may be reflected is broken up by the surface irregularities. The light shield 18 then does not act as a false, or second light source (parasitic light source), and thereby does not project a false, glaring or otherwise undesirable secondary source images in the projected beam pattern. The preferred ceramic inner layer 32 is metal carbide, that is then resistant to heat, light absorbing, and not light reflecting. Titanium carbide has been found to have a very black or near black color with respect to visible light, and therefore is the preferred material.

The preferred inner layer 32 may be formed by reactive sputtering process. The preferred method of making the coated light shield may be achieved by the following steps. First, a cup shaped light shield is formed as work piece from steel or other appropriate metal. This may be done by metal stamping, casting, or other convenient know metal working process. The cup is then cosmetically coated, at least on the exterior side, with a reflective metal coating, such as tin or nickel. This may be achieved by electroplating, or similar metal coating methods. Painting, and similar processes leaving outgasable coating components in the coating are discouraged. In the preferred embodiment, the interior surface of the light shield is then roughened. This may be achieved by particle blasting, or chemically etching the interior surface. The roughened interior surface helps bond subsequent coating, and helps break up any residual image reflection. The light shield is then placed a sputtering chamber with the cup interior facing the sputtering target. The chamber includes an organic gas component to react with the sputtered material. The preferred organic gas is acetylene. A metal is then sputtered in the chamber, so that the sputtered material impacts and adheres to the exposed interior surface of the light shield. The preferred metal is titanium, although others may be used. Titanium carbide is quite black, and highly resistant to heat. As the sputtered metal passes through the organic gas, the two react to form a particle with a metal carbide surface, or solid particle of metal carbide. As these particles impact the interior surface of the light shield, the particles adhere to the surface, thereby building up an agglomeration of particles. This agglomeration in general follows the interior surface, which may be roughened, but the agglomeration from particle to particle is not smooth, but quite rough. The irregular agglomeration of titanium carbide particles then absorbs light falling on it, and to the extent any light is reflected, any image in the reflected light tends to be broken up. The sputtering is continued until a sufficient layer coats the interior surface of the cup. Some additional processing may be necessary to clean, or otherwise prepare the light shield for final installation and use in a headlamp. The light shield is then installed in a headlamp.

The foot of the light shield 18 may be fitted in a slot, screwed, snap fitted, or otherwise coupled by a chosen coupling to the vehicle headlamp housing 12. It is generally believed that an interference type mechanical coupling is the best. The currently available glues are suspected to be subject to outgassing, melting, cracking or otherwise failing.

The lens 20 may be made out of glass or clear plastic to have the general form of a curved plate adapted with a sealing rim to mate with the vehicle headlamp housing 12. The vehicle headlamp housing 12 with the defined opening may then be sealed by the lens 20. The reflector 14, light source 16 and the light shield 18 are then enclosed by the lens 20.

In a working example some of the dimensions were approximately as follows: The vehicle housing was made of bulk filled plastic resin, and had a wall, a interior volume, a defined opening, a mounting and aiming hardware, a with a width, thickness, diameter, radius, length, centimeter (0.0 inch). The light shield may be made of cold rolled steal or stainless steel that is stamped into form. The Cup is then chrome plated. The interior is then sand blasted to roughen the surface. It is easier to chrome the whole cup, then to try to chrome only part of the cup, and chroming over a sand blasted area would reduce the effectiveness of the sand blasting. The cup exterior is then shielded and the cup interior is coated with titanium carbide. The cup has been tested for initial coating adhesion, heat resistance, photometrics, gloss and outgassing, and has passed the tests specified. Salt spray and color testing are in complete at this time. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A light shield for a nearby light source having a projected pattern of light, the light shield comprising:

a) a wall having a first side to face the light source, thereby defining a region of the projected beam pattern to be blocked by the shield; and b) a thin film coating of a ceramic adhered to the first side to face the light source.

2. The light shield in claim 1, wherein the ceramic coating comprises an agglomeration of particles.

3. The light shield in claim 1, wherein the ceramic coating has an unsmooth surface.

4. The light shield in claim 1, where in the surface of the ceramic coating is formed by reactive sputtering.

5. The light shield in claim 1, wherein the first side of the wall has a rough surface prior to adhering the ceramic coating.

6. The light shield in claim 1, wherein the ceramic coating is a metal carbide coating.

7. The light shield in claim 1, wherein the metal carbide is titanium carbide.

8. A vehicle headlamp having a light shield comprising:

a headlamp housing defining an enclosed volume, and an opening to the volume;

the housing enclosing a reflector, and a light source;

a light shield being positioned intermediate the light source and the opening; the light shield having a surface facing the light source including a layer of a high temperature ceramic; and a lens positioned to cover the opening.

9. A vehicle headlamp having a light shield comprising:

a headlamp housing defining an interior volume and an opening to the interior volume;

a reflector formed in the interior volume and facing the defined opening;

a light source supported and positioned in the housing with respect to the reflector to project light through the opening to form a light beam pattern; and a light shield having a wall defining an inner layer facing the light source; the light shield being supported in the interior volume; and a light absorbent, ceramic coating having an unsmooth surface formed on the inner layer.

10. The headlamp in claim 9, wherein the light shield is a coated metal body.

11. The headlamp in claim 9, wherein the ceramic coating is a titanium carbide coating.

12. The headlamp in claim 9, wherein the ceramic coating comprises an agglomeration of particles.

13. The headlamp in claim 9, wherein the ceramic coating comprises an irregular surface.

14. The headlamp in claim 9, wherein the surface of the ceramic coating is formed by reactive sputtering.

15. A vehicle headlamp having a light shield comprising:

a headlamp housing defining an interior volume and an opening to the interior volume;

a reflector formed in the interior volume and facing the defined opening;

a light source supported and positioned in the housing with respect to the reflector to project light through the opening to form a light beam pattern; and a metal light shield having a wall defining an inner layer facing the light source, and an outer surface facing the defined opening; the light shield being supported in the interior volume, and positioned intermediate the light source and the defined opening; and a reactive sputtered, titanium carbide coating formed on the inner layer having an unsmooth surface.

16. A light shield for a nearby light source having a projected pattern of light, the light shield comprising:

a) a wall having a first side facing the light source, thereby defining a region of the projected beam pattern to be blocked; and b) a thin film coating of a metal carbide adhered to the first side.

17. The light shield in claim 16, wherein the first side has rough surface prior to adhering the metal carbide.

18. The light shield in claim 16, wherein the metal carbide is titanium carbide.

19. A method of making a light shield comprising the steps of:

a) forming a light shield wall with a first side to face a light source b) roughening the first side; and c) adhering a metal carbide to the first side.

20. The method in claim 19, wherein the metal carbide is formed by sputtering metal particles in an organic gas to carborize the sputtered metal particles, and impinging the formed metal carbide particles on the first side.

* * * * *